Jan. 16, 1968   G. W. ANDERSON   3,363,315
HUNTING KNIFE
Filed July 3, 1967
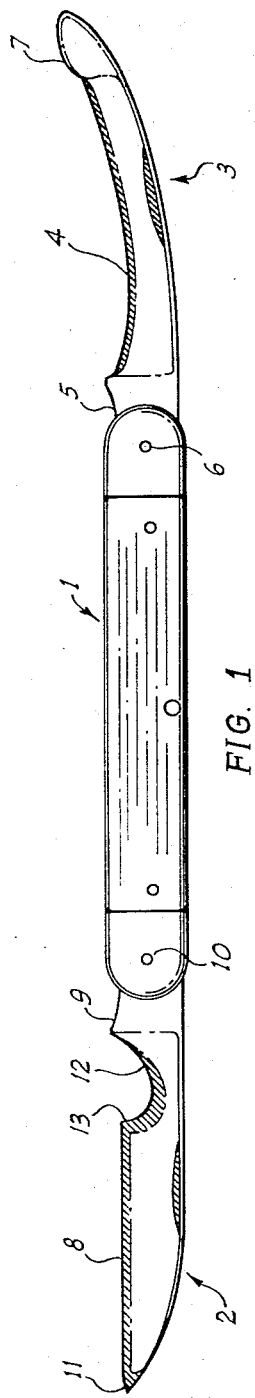
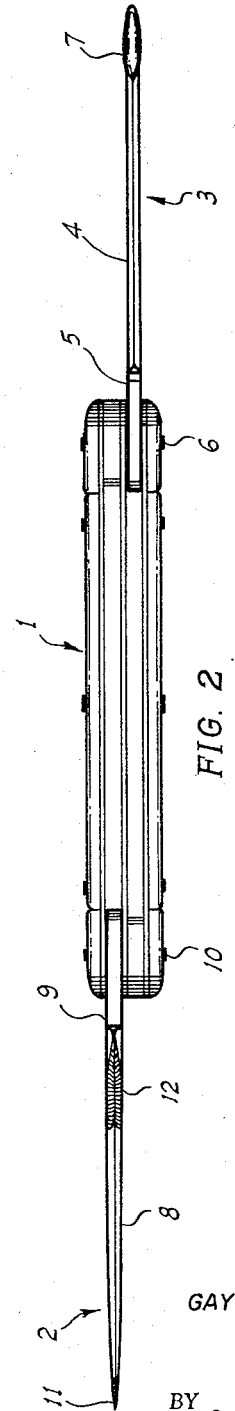
GAYLE W. ANDERSON
INVENTOR.
BY
ATTORNEY

3,363,315
HUNTING KNIFE
Gayle W. Anderson, 4405 Pershing,
Fort Worth, Tex. 76107
Filed July 3, 1967, Ser. No. 650,975
2 Claims. (Cl. 30—152)

ABSTRACT OF THE DISCLOSURE

A knife for use in dressing white tail deer and other like animals in the field. Consists substantially in its entirety of a handle and a plurality of two blades, as more particularly described, which are pivotally connected at one end to the handle and are adapted to be folded into the handle in one position thereof, in the manner of a pocket knife. The two blades together with the handle form a complete tool for use in performing successively a series of operations which are necessarily involved in dressing in the field a deer, antelope, goat, sheep, or other four legged game animal.

---

This invention relates to a hunting knife, and it concerns more particularly a knife for use in dressing white tail deer and other like animals in the field.

A white tail deer, in Texas, is a medium size deer which may weigh as much as 175 pounds, for example. The invention is also useful for dressing in the field other species of deer, of larger and smaller size, as well as antelope, goats, sheep, and other four legged game animals.

In one form thereof the invention contemplates a knife, of such size and weight that it may be readily carried in the pocket, which consists substantially in its entirely of a handle and a plurality of two blades, each as hereinafter described, which are pivotally connected at one end to the handle and are adapted to be folded into the handle in one position thereof.

At least one of the above mentioned blades, considered separately, is known to be old, and the novelty of this invention is believed to lie in the combination, in a single knife, of two blades, as more particularly described, which together form a complete tool for use in performing successively a series of operations which are necessarily involved in dressing in the field a deer, antelope, goat, sheep, or other four legged game animal.

The invention is not necessarily limited to a knife which is sufficiently small to be carried in the pocket, but is applicable also to larger knives which, because of their relatively greater size and weight, necessarily must be carried in a scabbard.

The invention likewise does not exclude knives as described having one or more other blades, in addition to the two blades above mentioned.

The invention will be readily understood by referring to the following description and the accompanying drawing, in which:

FIG. 1 is a longitudinal view of a knife embodying the invention, showing one side of the knife and showing the blades in their extended positions relative to the handle; and FIG. 2 is a longitudinal view taken at right angles to the view shown in FIG. 1.

Referring to the drawing, the knife of the invention consists substantially in its entirety of a handle, designated generally by the numeral 1, and two blades as more particularly described, which comprise, respectively, an anus or vent blade, indicated generally by the numeral 2, and a gutting and skinning blade, indicated generally by the numeral 3.

The gutting and skinning blade 3, which is generally hook shaped, has a continuously curved inside longitudinal edge 4, which is sharpened and comprises its sole cutting edge, beginning at the outer extremity of its shank portion 5, which is pivotally connected, as at 6, to the handle 1.

The gutting and skinning blade 3 is characterized by a long taper, its width being progressively reduced in the direction of its outer end, beginning of the outer extremity of its shank portion 5. The blade 3 terminates at its outer end in a comparatively blunt but pointed, thickened and enlarged end portion 7.

The gutting and skinning blade 3 is a versatile blade, and is useful in performing a number of the several operations which necessarily are involved in dressing an animal in the field, such as making a longitudinal incision in the belly of the animal, extending through the hide and the muscle but not puncturing the intestines, and for making other incisions in the skin overlying the muscle, but leaving the muscle intact, preparatory to removing the skin or portions thereof.

The gutting and skinning blade 3 above described is known to be old and is not claimed herein per se. Applicant knows of such a blade as incorporated in a knife of German origin, which is comparatively large and is carried in a scabbard, and which is intended for general use and includes a varied assortment of blades, none comparable to the anus or vent blade 2 as hereinafter described.

The anus or vent blade 2 has a longitudinal edge which is straight, as at 8, beginning at a point beyond the outer extremity of its shank portion 9, which is pivotally connected to the handle 1, as at 10. The straight edge 8 of the blade 2 is sharpened and comprises its principal cutting edge.

The longitudinal edge of the blade 2 opposite the straight edge 8 is continuously curved in the direction of the straight edge 8 beginning at the outer extremity of the shank portion 9, and intersects the straight edge 8 adjacent the outer end of the blade 2 to form a pointed end portion 11. The blade 2 is sharpened on both sides of the point 11.

The first mentioned longitudinal edge of the blade 2 has a hook shaped indentation 12 therein immediately adjacent the outer extremity of the shank portion 9, between the shank portion 9 and the straight edge 8. The indentation 12, the peripheral edge of which is sharpened and forms a second cutting edge of the blade 2, includes an edge portion 13 which faces rearwardly, relative to movement of the blade 2 longitudinally in the direction of its pointed end portion 11, and which approaches the straight edge 8 substantially at right angles thereto.

The anus or vent blade 2 is useful primarily for cutting around the terminal colon of an animal, from the outside, to disengage it from surrounding tissue, preparatory to removing it from the inside in an operation in which the animal is disemboweled, the belly of the animal being opened as above described and the aesophagus being severed from the inside.

In use, the straight edge 8 of the blade 2 extends deep into the flesh surrounding the terminal colon, as above described, and the edge portion of the blade 2 which is formed by the indentation 12 is engageable with the overlying skin, which is relatively tougher, whereby the terminal colon may be readily severed by cutting around it from the outside, in one continuous slicing motion while advancing the blade 2 in a circular path, at the same time moving it reciprocally in a longitudinal direction.

The invention may be modified in various ways without departing from the spirit and scope thereof.

I claim:
1. In a knife for use in dressing white tail deer and other like animals in the field, the combination of a knife which comprises substantially in its entirety of a handle and a plurality of two blades, said handle having a cavity along the length thereof, each of said blades being pivotally connected at one end to the handle and adapted to be folded into the handle in one position thereof, in the manner of a pocket knife, the two blades together with the handle forming a complete tool for use in performing successively a series of operations which are necessarily involved in dressing in the field a deer, antelope, goat, sheep, or other four legged game animal, one of the blades being generally arcuately shaped along its length and having its inside longitudinal edge sharpened to form its sole cutting edge, said one blade being tapered and having its width progressively reduced in the direction of its outer end, and the outer end thereof being blunt but pointed, and being thickened and enlarged, and the other of the blades having a shank portion and a straight cutting edge coextensive with a major portion of its length and terminating in a pointed end portion, said blade having an indented, hook shaped portion immediately adjacent the shank portion, said hook shaped portion being located between the shank portion and the straight edge, the hook shaped portion being sharpened to form a cutting edge and said hook shaped portion including an edge portion which faces rearwardly, relative to movement of the blade longitudinally in the direction of its pointed end portion.

2. The structure of claim 1, the last mentioned blade being sharpened on both sides of the point.

References Cited

UNITED STATES PATENTS

| D. 34,401 | 4/1901 | Herr | 30—286 X |
| 2,364,333 | 12/1944 | Wisher | 17—7 |

FOREIGN PATENTS 761,338   3/1934   France.

OTHELL M. SIMPSON, *Primary Examiner.*

G. WEIDENFELD, *Assistant Examiner.*